United States Patent [19]

Yale et al.

[11] Patent Number: 4,864,864
[45] Date of Patent: Sep. 12, 1989

[54] METHOD FOR MEASURING STRESS DEFORMATION OF MATERIALS

[75] Inventors: David P. Yale, Dallas; Robin B. Montgomery, Mesquite; Eve S. Sprunt, Farmers Branch, all of Tex.

[73] Assignee: Mobil Oil Corporation, New York, N.Y.

[21] Appl. No.: 238,680

[22] Filed: Aug. 30, 1988

[51] Int. Cl.$^4$ .................................................. G01L 1/24
[52] U.S. Cl. .......................................... 73/800; 356/32
[58] Field of Search ................ 73/800, 788; 356/32, 356/35.5; 364/508

[56] References Cited

U.S. PATENT DOCUMENTS

| | | | |
|---|---|---|---|
| 3,587,301 | 6/1971 | Chau | 73/800 |
| 3,839,899 | 10/1974 | McMillen | 73/38 |
| 4,380,930 | 4/1983 | Podhrasky et al. | 73/594 |
| 4,688,238 | 8/1987 | Sprunt et al. | 378/4 |

FOREIGN PATENT DOCUMENTS 735773  6/1980  U.S.S.R. .................................. 73/800

Primary Examiner—Jerry W. Myracle
Attorney, Agent, or Firm—Alexander J. McKillop; Charles J. Speciale; George W. Hager, Jr.

[57] ABSTRACT

A sample of material is rotated within a pair of parallel, spaced-apart laser beams. Variations in the diameter of the sample are determined with azimuth from the amounts of the laser beams intercepted by the sample as it rotates about an axis perpendicular to the plane of the laser beams. The sample is translated along this axis within the path of the laser beams so that the diameter of the sample is determined for a plurality of spaced-apart planes through the sample perpendicular to the axis of rotation. The deformation of the material with stress is determined by measuring the variations in diameter of the sample as the stress on the sample is changed.

21 Claims, 2 Drawing Sheets

METHOD FOR MEASURING STRESS DEFORMATION OF MATERIALS

BACKGROUND OF THE INVENTION

The application of a stress to the surface of a sample of material, or the relief of that stress, may cause deformation of the sample. Such deformation is elastic if it occurs simultaneously with the application or removal of the stress and is viscoelastic if the sample slowly deforms with time after the stress has been applied or removed. The deformation in many materials may not be uniform, especially when the stress is nonuniform. For example, the viscoelastic deformation of a core sample taken from a subterranean formation is nonuniform following its removal from the stress created by the anisotropic in-situ formation stress. The deformation of the core sample in a vertical plane through the sample will be different than the deformation in a horizontal plane through the sample and such deformations are further complicated by the directionally dependent elastic constants of the core sample material and by the directionally of horizontal stresses in the subterranean formation.

Measurement of this deformation has been carried out by strain gages or linear voltage displacement transducers (LVDTs) located at a plurality of discreet points on the surface of a sample of a material. For example, FIG. 1 illustrates a core sample 10 having a plurality of strain gages 11 affixed to its outer surface for measuring deformation at the affixed points, while FIG. 2 illustrates a core sample 13 having a plurality of LVDT's 14 affixed to its outer surface for measuring deformation. Consequently, only the deformation at such discrete points is being measured and assumption is made that deformation in a plane, horizontal or vertical, through each of such discrete points is uniform or elliptical.

However, because of directionally dependent elastic constants of the sample material and differential stresses on the sample material, such as directionally dependent stresses in subterranean formations, such assumptions as to uniform deformation in a horizontal or vertical plane will be invalid and any attempt to calculate deformation of the entire sample from such discrete measurements will fail. Accordingly, it is an object of the present invention to provide a measurement of the true stress deformation of the entire body of a sample material, viscoelastic, elastic or thermal, without making assumptions as to how the sample material should deform.

SUMMARY OF THE INVENTION

The present invention is directed to a method for measuring stress deformation of a material. A sample of a material is rotated about an axis through the sample. A dimension of the sample is measured in a plurality of azimuthal directions about the axis within a plurality of parallel planes through the sample perpendicular to the axis. These measurements are repeated during a plurality of time intervals. Variations in the measured dimensions are determined for the same one of the azimuthal directions within the same one of the parallel planes through the sample as a measure of the stress deformation of the sample over the plurality of time intervals. A profile of sample stress deformation with time is created from such measured dimension variations.

In a more specific aspect, the sample is rotated so that at least a portion of the sample intercepts at least a portion of a laser beam. Variation in the amount of the laser beam intercepted by the sample as it rotates is a measure of variation in the shape of the sample as it undergoes stress deformation.

In a yet further aspect, the sample is rotated within a pair of parallel, spaced-apart laser beams. Such rotation is about an axis through the sample perpendicular to the paths of the laser beams. Variations in the diameter of the sample are determined with azimuth in a first plane through the sample intercepted by the laser beams. Such variations in diameter are determined from measurements in the amounts of the laser beams intercepted by the sample as it rotates. The sample is then translated along its axis through a plurality of positions such that the laser beams intercept the sample in a corresponding plurality of planes through the sample which are in spaced-apart, parallel positions from the first plane through the sample. Variations in the diameter of the sample are determined with azimuth in each of the plurality of planes through the sample intercepted by the laser beams. Such variations are determined from measurements in the amounts of the laser beams intercepted by the sample as it is rotated about its axis at each of the plurality of translated positions. The diameter variations with time in each of the parallel planes is utilized to provide a stress deformation profile for the sample.

DETAILED DESCRIPTION OF THE INVENTION

Figure 1:
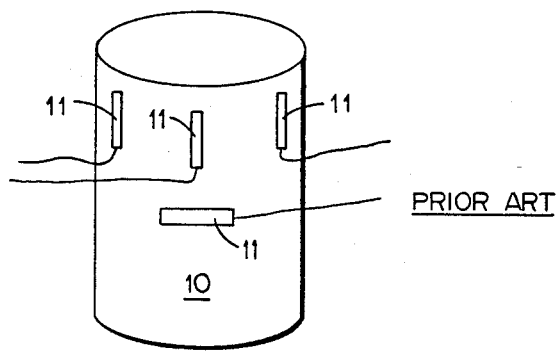
FIGS. 1 and 2 illustrate prior art methods of measuring deformation of a sample material using strain gages and linear voltage displacement transducers respectively.
Figure 2:
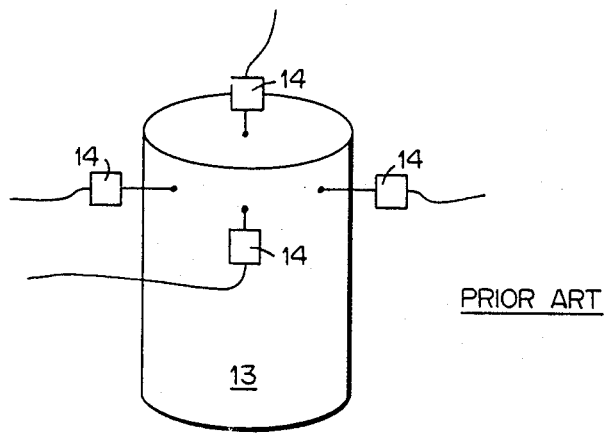
Figure 3:
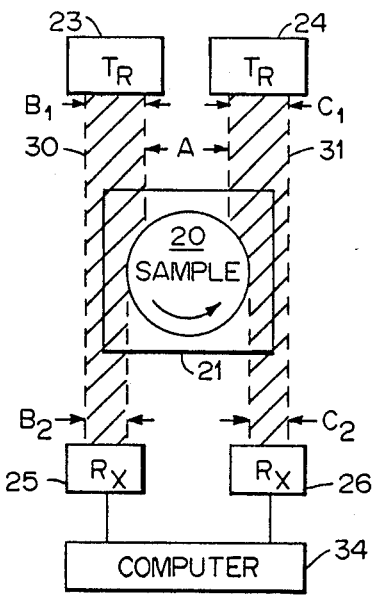
FIGS. 3 and 4 are top and side views respectively of apparatus for carrying out the method for material deformation measurement in accordance with the present invention.
Figure 4:
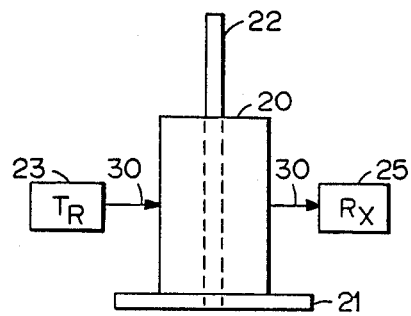

In accordance with the present invention there is provided a method for measuring the stress deformation of a material over its entire surface. Referring now to FIGS. 3 and 4, there is shown, in top and side views respectively, a preferred embodiment of apparatus for carrying out such deformation measurements. A sample 20 of a material to be measured for deformation is placed on a rotational stage 21, shown in both FIGS. 3 and 4, which in turn is mounted on a vertical translation stage 22 shown in FIG. 4. The sample could be a block or cylinder of a material undergoing viscoelastic deformation due to the relief of applied or naturally-induced stress or undergoing stress from a pressure applying device (not shown) such as a typical load frame or a pressure vessel of the type described in McMillen U.S. Pat. No. 3,839,899 or in Podhrasky and Sprunt U.S. Pat. No. 4,380,930 for examples. Rotational stage 21 may preferably be the Klinger Scientific RT 300 rotational stage and translational stage 22 may preferably be the Klinger Scientific GV-88 translational stage. Rotational stage 21 may be driven by a controller (not shown) such as a Klinger Scientific CC-1 and equipped with an encoder (not shown) to identify its exact azimuthal position.

The deformation measuring device is preferably a laser profiling system such as the Techmet Laser Micrometer Gaging System comprising a pair of laser micrometer sources 23 and 24 and a pair of laser micrometer receivers 25 and 26. The sample 20, rotational stage 21 and translational stage 22 are mounted between the laser sources 23 and 24 and the laser receivers 25 and 26. As shown in FIG. 3, the laser source 23 and its corresponding laser receiver 25 are both spaced apart from laser source 24 and its corresponding laser receiver 26 such that the laser beam 30 and the laser beam 31 intercept opposite sides of the sample 20 as it is rotated and translated between such laser beams. As shown in FIG. 3, the distance A between laser beams 30 and 31 is less than the minimum outside diameter of sample 20 to be encountered during the deformation measurement. A portion B of laser beam 30 interrupted by the rotating sample 20 is the difference between the transmitted portion B1 of beam 30 and the received portion B2 of beam 30 (i.e. B=B1−B2). Likewise a portion C of laser beam 31 interrupted by the rotating sample 20 is the difference between the transmitted portion C1 of beam 31 and the received portion C2 of beam 31 (i.e. C=C1−C2).

Laser receivers 25 and 26 are used to measure these interrupted portions B and C of the laser beams 30 and 31 respectively. These interrupted portions B and C, as well as the distance A between the two beams, are applied to a computer 34, such as the Hewlett-Packard 9000-320, for computation of the diameter of sample 20 (i.e. diameter=A+B+C).

Such a dual laser micrometer profile system measures the diameter of the sample 20 to within ten-millionths of an inch. Rotational stage 21 is utilized to rotate sample 20 through a plurality of azimuths in an initial horizontal plane with the laser profile system measuring the sample diameter at each azimuth. The plurality of measured diameters for such plurality of azimuths are utilized by computer 34 to construct a profile of the sample 20 in the initial plane of rotation. The translational stage 22 then moves the sample 20 vertically to a new plane of rotation and where the sample is again rotated through the plurality of azimuths and the sample profile is again constructed for this new plane of rotation. After a laser profile of sample diameters is constructed for this initial cycle of measurements as a measure of the degree to which the sample is elliptical or unsymmetrical about its axis, the computer constructs an initial profile of the size and shape of the entire sample. Both the maximum and minimum measured diameters in each of the plurality of parallel planes may now be identified and correlated with azimuth. The azimuth of maximum stress is then identified as the azimuth correlating with such maximum measured diameter, while the azimuth of minimum stress is then identified as the azimuth correlating with such minimum measured diameter.

The rotational stage 21 and translational stage 22 then brings the sample 20 back to its original position. The sample 20 may again be rotated through the same plurality of azimuths and translated through the same plurality of rotational planes and a second cycle of measurements made. The measured differences between the sample diameters at corresponding azimuths and rotational planes for the two measurement cycles is the deformation of the sample during the time interval between such measurement cycles. By repeating the measurements over a plurality of cycles a profile of sample deformation with time is constructed by the computer. Such a profile will be a record of either the viscoelastic deformation of the sample due to stress relief, the elastic deformation of the sample due to differing stress conditions being applied to the sample over the plurality of measurement cycles or the thermal deformation of the sample due to changing temperature conditions. Consequently the method of the present invention provides for a diameter profile of a sample undergoing viscoelastic, elastic, or thermal deformation which does not rely on assumptions as to how the sample should deform between discreet strain gage or LVDT measurement points.

A further feature of the present invention is that the laser profile measurements are noncontact measurements as contrasted with strain gage measurements which are epoxied to the surface of a sample and with LVDT measurements which require spring loaded contact with a sample. In soft sample materials the strain gages cannot be properly affixed to the sample surface and the LVDTs embed themselves in the material, both thereby giving incorrect deformation measurements. The laser profile measurements of the present invention permit deformation measurements without physically contacting the sample.

While a dual laser beam profiling system has been described as a preferred embodiment for carrying out the method of the present invention, a single laser beam profiling system may be employed to measure radius variations in the material sample as it undergoes stress deformation. Other modifications or alterations may also be made without departing from the spirit and scope of the invention as set forth in the appended claims.

We claim:

1. A method for measuring stress deformation of a material, comprising the steps of:
    (a) rotating a sample of a material undergoing stress deformation about an axis through said sample,
    (b) measuring a dimension of said sample in a plurality of azimuthal directions about said axis within a plurality of parallel planes through said sample perpendicular to said axis,
    (c) repeating steps (a) and (b) during each of a plurality of time intervals, and
    (d) determining variations in said measured dimensions for the same one of said azimuthal directions within the same one of said parallel planes through said sample as a measure of the stress deformation of said sample over said plurality of time intervals.

2. The method of claim 1 further including the step of creating a profile of sample stress deformation with time from said differences in said measured dimension variations.

3. The method of claim 1 wherein the step of measuring the dimensions of said sample is carried out by rotating said sample within the path of at least one laser beam and measuring the amount of said at least one laser beam intercepted by at least a portion of said sample.

4. The method of claim 3 wherein the measured dimension is the sample radius.

5. The method of claim 3 wherein the step of measuring the dimension of said sample is carried out by rotating said sample with the parallel paths of a pair of spaced-apart laser beams such that said laser beams intercept opposite portions of said sample.

6. The method of claim 5 wherein the measured dimension is the sample diameter.

7. A method for measuring stress deformation of a material, comprising the steps of:
    (a) rotating a sample of a material undergoing stress deformation about an axis through said sample for a first time interval, (b) measuring the diameter of said sample in a plurality of azimuthal directions about said axis in each of a plurality of parallel planes through said sample perpendicular to said axis as said sample is rotated for said first time interval, (c) repeating steps (a) and (b) for a second time interval, and (d) comparing the measured diameters of said sample for corresponding azimuthal directions in corresponding parallel planes through said sample for said first and second time intervals as a measure of stress deformation of said sample from said first time interval to said second time interval.

8. The method of claim 7 further including the step of repeating steps (a)–(d) for a plurality of time intervals to provide a profile of sample stress deformation with time.

9. The method of claim 7 wherein the step of measuring the diameter of said sample is carried out without physical contact with said sample.

10. The method of claim 9 wherein the step of measuring the diameter of said sample is carried out by rotating said sample within the paths of a pair of spaced-apart laser beams such that one portion of said sample intercepts one of said beams and an opposite portion of said sample intercepts the other of said beams.

11. A method for measuring stress deformation of a material, comprising the steps of:

(a) rotating a sample of a material undergoing stress deformation within a pair of parallel, spaced-apart laser beams, said rotation being about an axis through said sample perpendicular to the paths of said laser beams, (b) determining the variation in diameter of said sample with azimuth in a first plane through said sample intercepted by said laser beams by measuring variations in the amounts of said laser beams intercepted by said sample as it is rotated about said axis, (c) translating said sample along said axis through a plurality of positions such that said laser beams intercept said sample in a corresponding plurality of planes through said sample which are in spaced-apart, parallel positions from said first plane through said sample, (d) determining the variation in diameter of said sample with azimuth in said plurality of parallel planes through said sample intercepted by said laser beams by measuring the variations in the portions of said paths of said laser beams intercepted by said sample as it is rotated about said axis at each of said plurality of translated positions, and (e) determining the stress deformation with time of said sample within each of said plurality of parallel planes through said sample from the measured variations in diameter of said sample within each of said plurality of parallel planes.

12. The method of claim 11 further comprising the step of recording the determined stress deformations for each of said parallel planes to provide a profile of stress deformation with time along the length of said sample in a direction parallel to said axis.

13. The method of claim 11 wherein the paths of said laser beams are spaced-apart a distance no greater than the minimum diameter to be experienced by said sample from stress deformation within any one of said parallel planes through said sample during the carrying out of steps (a)–(d).

14. The method of claim 11 wherein the distance across said spaced-apart laser beams is greater than the maximum diameter to be experienced by said sample from stress deformation within any one of said parallel planes through said sample during the carrying out of steps (a)–(d).

15. The method of claim 11 wherein the spacing of said laser beams and the widths of said laser beams are such that both beams are continuously intercepted by said sample as it experiences diameter variation during the carrying out of steps (a)–(d).

16. The method of claim 11 wherein steps (a)–(d) are carried out during a period of viscoelastic stress deformation of said sample.

17. The method of claim 11 wherein steps (a)–(d) are carried out during a period of elastic stress deformation of said sample.

18. The method of claim 11 wherein steps (a)–(d) are carried out during a period of thermal stress deformation of said sample.

19. The method of claim 11 further comprising the steps of:

(a) identifying the maximum and minimum measured diameters in each of said plurality of parallel planes, (b) correlating said maximum measured diameters with azimuth in each of said plurality of parallel planes, (c) identifying the azimuth of maximum stress as the azimuth correlating with said maximum measured diameters, (d) correlating said minimum measured diameter with azimuth in each of said plurality of parallel planes, and (e) identifying the azimuth of minimum stress as the azimuth correlating with said minimum measured diameter.

20. A method for measuring stress deformation of a material, comprising the steps of:

(a) rotating a sample of a material undergoing stress deformation about an axis through said sample, (b) measuring a dimension of said sample in a plurality of parallel planes through said sample perpendicular to said axis as said sample rotates about said axis, and (c) determining variations in said measured dimension as a measure of the degree to which said sample is unsymmetrical about said axis in each of said parallel planes.

21. The method of claim 20 further comprising the step of constructing a profile of the size and shape of said sample from said variations in said measured dimension in said plurality of parallel planes.

* * * * *